United States Patent
Ido et al.

(10) Patent No.: US 12,460,980 B2
(45) Date of Patent: Nov. 4, 2025

(54) UPPER AND LOWER LIMIT DETECTING APPARATUS AND METHOD FOR ELECTRIC CHAIN BLOCK

(71) Applicant: KITO CORPORATION, Yamanashi (JP)

(72) Inventors: Yusaku Ido, Nakakoma-gun (JP); Takuma Isshiki, Nakakoma-gun (JP)

(73) Assignee: KITO CORPORATION, Nakakoma-gun (JP)

( * ) Notice: Subject to any disclaimer, the term of this patent is extended or adjusted under 35 U.S.C. 154(b) by 295 days.

(21) Appl. No.: 18/265,510

(22) PCT Filed: Nov. 9, 2021

(86) PCT No.: PCT/JP2021/041199
§ 371 (c)(1),
(2) Date: Jun. 6, 2023

(87) PCT Pub. No.: WO2022/123984
PCT Pub. Date: Jun. 16, 2022

(65) Prior Publication Data
US 2024/0035907 A1    Feb. 1, 2024

(30) Foreign Application Priority Data
Dec. 11, 2020   (JP) ................... 2020-206139

(51) Int. Cl.
*G01L 5/00* (2006.01)
*G01L 1/26* (2006.01)

(52) U.S. Cl.
CPC .............. *G01L 5/0061* (2013.01); *G01L 1/26* (2013.01)

(58) Field of Classification Search
CPC ............ G01L 5/0061; G01L 1/26; B66D 3/22
See application file for complete search history.

(56) References Cited

U.S. PATENT DOCUMENTS

| 7,080,825 B1 | 7/2006 | George et al. |
| 2022/0396457 A1* | 12/2022 | Nishikawa ............. B66D 1/485 |
| 2023/0138172 A1* | 5/2023 | Omura ..................... B66D 3/20 |
| | | 254/358 |

FOREIGN PATENT DOCUMENTS

| CN | 203269431 U | * | 11/2013 |
| CN | 203474336 U | * | 3/2014 |

(Continued)

OTHER PUBLICATIONS

International Search Report dated Jan. 25, 2022, issued in counterpart International Application No. PCT/JP2021/041199, with English translation. (7 pages).

(Continued)

*Primary Examiner* — Octavia Hollington
(74) *Attorney, Agent, or Firm* — WHDA, LLP

(57) ABSTRACT

An upper and lower limit detecting apparatus and method for a load suspending device of an electric chain block capable of easily and rapidly detecting reaching of the load suspending device to a lower limit without providing a lower limit reaching detection limit switch. In an electric chain block including electric motor, friction clutch, electromagnetic brake, speed reduction gear mechanism, load sheave, load chain, load suspending device, etc., the reaching of the load suspending device to the upper limit is detected by an upper-limit reaching detection limit switch, and the reaching of the load suspending device to the lower limit is detected by judging, with an electric power type overload limiter, that the power consumption of the electric motor has exceeded a predetermined value as a result of a stopper abutting against a chain guide and the friction clutch being dragged by rotational force of the electric motor.

4 Claims, 7 Drawing Sheets

(56) References Cited

FOREIGN PATENT DOCUMENTS

| CN | 102811939 B | * | 4/2015 | ............... B66D 1/46 |
|----|---|---|---|---|
| EP | 3632834 A1 | | 4/2020 | |
| JP | S57-9356 Y2 | | 2/1982 | |
| JP | H11-209081 A | | 8/1999 | |
| JP | 2003-252575 A | | 9/2003 | |
| JP | 2005029280 A | * | 2/2005 | |
| JP | 2013010634 A | * | 1/2013 | ............... B66D 1/54 |
| JP | 2018118814 A | * | 8/2018 | |
| JP | 2019-011165 A | | 1/2019 | |

OTHER PUBLICATIONS

Written Opinion dated Jan. 25, 2022, issued in counterpart International Application No. PCT/JP2021/041199, with English translation. (9 pages).

* cited by examiner

UPPER AND LOWER LIMIT DETECTING APPARATUS AND METHOD FOR ELECTRIC CHAIN BLOCK

TECHNICAL FIELD

The present invention relates to an electric chain block which hoists (lifts up) and lowers (lowers down) a heavy object (hereinafter referred to as a "load"), and more particularly, the present invention relates to an upper and lower limit detecting apparatus and method for an electric chain block, whereby, when a load suspending device (e.g. a hook) suspending a load reaches a lower limit, the reaching of the load suspending device to the lower limit can be reliably detected, and it is possible to deal with the overload situation of the electric motor, unlike a conventional mechanism for detecting reaching the lower limit, such as a limit switch, which has a complicated structure and requires adjustment and other operation after the installation thereof.

BACKGROUND ART

Conventionally, an electric chain block is provided with both an upper limit reaching detection limit switch for detecting that a load suspending device attached to a load chain has reached the upper limit, and a lower limit reaching detection limit switch for detecting that the load suspending device has reached the lower limit. When the load suspending device has reached the upper limit or the lower limit, electric power supplied to an electric motor in operation is cut off to stop the operation of the electric motor, thereby preventing burnout or other failure of the electric motor. In addition, the electric chain block has a friction clutch provided in a driving force transmission path to prevent overload of a mechanical system.

CITATION LIST

Patent Literature

Patent Literature 1: Japanese Examined Utility Model Application Publication No. Syo 57-9356

SUMMARY OF INVENTION

Technical Problem

For an electric chain block, there is a method of detecting that a load suspending device attached to a load side terminal of a load chain has reached a lower limit by detecting a load chain retaining terminal piece attached to a no-load side terminal of the load chain by a lower limit reaching detection limit switch, and stopping the electric motor. Usually, the lower limit reaching detection limit switch is disposed in the neighborhood of a chain guide provided on the machine body to guide the load chain, and in order to reliably detect the reaching of the terminal piece, components are restricted in structure and arrangement, resulting in a problem of increasing in size. Further, the limit switch comprises a large number of components, such as a limit lever, a switch body, lead wires, and packing; therefore, the component count is high, and the cost increases. In addition, the limit switch suffers from a problem that, after the components have been installed, it is necessary to perform a complicated operation to confirm whether or not the limit switch normally functions as a lower limit reaching detection limit switch and to make necessary adjustment. Further, an electric chain block using a friction clutch has the following problem. Even if the friction clutch is activated when a load suspending device, e.g. a hook, has reached the lower limit to prevent overload of the mechanical system, the friction clutch continues being dragged until the chain block operation is stopped, resulting in an increase in the amount of heat generated, which has the adverse effect of reducing the lifetime of the friction clutch, and so forth.

The present invention has been made in view of the above-described problems. An object of the present invention is to provide an upper and lower limit detecting apparatus and method for an electric chain block, wherein the electric chain block is provided with an electric power type overload limiter, and wherein, in view of the fact that electric power consumed by an electric motor increases when a load suspending device such as a hook has reached a lower limit and a friction clutch is activated, the electric motor is stopped upon detecting the increased power consumption of the electric motor with the electric power type overload limiter.

Solution to Problem

The present invention resides in an upper and lower limit detecting apparatus for a load suspending device of an electric chain block including an electric motor, a rotational force transmission mechanism rotated by the electric motor, a rotating device rotated by the rotational force transmission mechanism, and a load chain wound on the rotating device to perform hoisting and lowering, the upper and lower limit detecting apparatus comprising an upper limit reaching detection device detecting that a load suspending device attached to a load-side end of the load chain has reached an upper limit, and a friction clutch (overload preventing coupling) provided in the rotational force transmission mechanism, wherein reaching of the load suspending device to the upper limit during the hoisting is detected by the upper limit reaching detection device, and reaching of the load suspending device to a lower limit during the lowering is detected by judging, with an electric power type overload limiter, that power consumption of the electric motor has exceeded a predetermined value as a result of activation of the friction clutch.

In addition, the present invention resides in the above-described upper and lower limit detecting apparatus for the load suspending device of the electric chain block, wherein a judgment threshold value of the electric power type overload limiter for the lowering of the load suspending device is set to a value less than a judgment threshold value of the electric power type overload limiter for the hoisting of the load suspending device and greater than power consumption in no-load lowering of the load suspending device.

In addition, the present invention resides in the above-described upper and lower limit detecting apparatus for the load suspending device of the electric chain block, wherein the upper limit reaching detection device is a limit switch.

In addition, the present invention resides in an upper and lower limit detecting method for a load suspending device of an electric chain block including an electric motor, a rotational force transmission mechanism rotated by the electric motor, a rotating device rotated by the rotational force transmission mechanism, and a load chain wound on the rotating device to perform hoisting and lowering, the upper and lower limit detecting method comprising the steps of: detecting that the load suspending device attached to a load-side end of the load chain has reached an upper limit by an upper limit reaching detection device provided in the electric chain block; and detecting that the load suspending device has reached a lower limit by judging, with an electric power type overload limiter, that power consumption of the electric motor has exceeded a predetermined value as a result of activation of a friction clutch (overload preventing coupling) provided in the rotational force transmission mechanism.

Advantages of Invention

According to the present invention, reaching of the load suspending device to the upper limit is detected by the upper limit reaching detection device provided in the machine, and reaching of the load suspending device to the lower limit is detected by judging, with the electric power type overload limiter, that the electric motor has shifted from regenerative operation to electric power consuming operation as a result of the load suspending device reaching the lower limit and the friction clutch being activated. Consequently, it becomes unnecessary to use a lower limit reaching detection device such as a limit switch, which requires a large number of components, to detect reaching of the load suspending device to the lower limit, and it is possible to detect reaching of the load suspending device to the lower limit simply by changing the software of a microcomputer provided in the electric chain block. Thus, it is possible according to the present invention to obtain great advantages.

DESCRIPTION OF EMBODIMENTS

Figure 1:
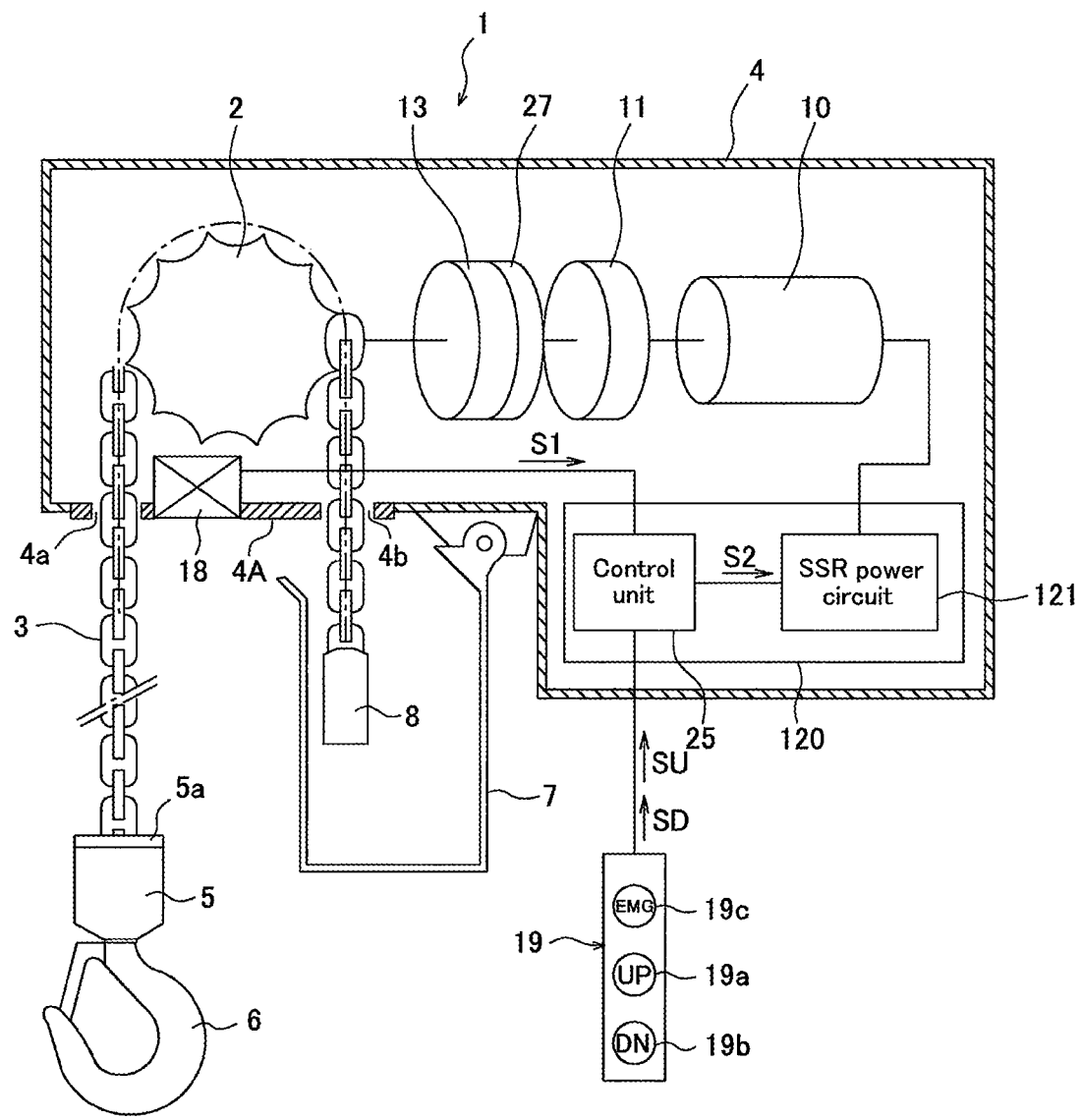
FIG. 1 is a schematic diagram of an electric chain block 1.

An embodiment of the present invention will be explained below in detail. FIG. 1 is a schematic diagram of an electric chain block 1 according to the present invention. The electric chain block 1 includes components and devices such as an alternating-current electric motor (in this example, three-phase induction electric motor) 10 for hoisting and lowering a load, a friction clutch (overload torque transmission preventing device) 11, an electromagnetic brake 27, a speed reduction gear mechanism 13, an SSR (solid-state relay) power circuit 121, and a control unit 25. These components and devices are adjusted so as to perform their respective functions and appropriately disposed in a machine casing 4. Reference numeral 2 denotes a load sheave (rotating device) disposed in the machine casing 4. The load sheave 2 has a load chain 3 wound thereon to hoist and lower a load (not shown).

When the alternating-current electric motor 10 is started and a rotor thereof rotates in a forward rotation direction (load hoisting direction), the rotational force of the rotor is transmitted to the rotating shaft of the load sheave 2 via the friction clutch 11 and the speed reduction gear mechanism 13 (i.e. the friction clutch 11, the speed reduction gear mechanism 13, etc. constitute a rotational force transmission mechanism), causing the load sheave 2 to rotate in the forward rotation direction. The load chain 3 is moved in a load hoisting direction, i.e. a direction for lifting up a hook 6 as a load suspending device by the rotation of the load sheave 2. It should be noted that the hook 6 is attached to a lower end (load-side end) of the load chain 3 through a coupling member 5 so that the hook 6 is rotatable in a plane perpendicular to the vertical direction of the load chain 3. The load chain 3 has a stopper (terminal piece) 8 attached to the other end (no-load side end) thereof. When the chain is over lowered, the stopper 8 engages the lower surface of the periphery of a chain guide hole 4b in a chain guide 4A provided at the bottom of the machine casing 4, thereby preventing the load chain 3 from coming out of the machine body. Reference numeral 18 denotes an upper limit reaching detection limit switch (hereinafter abbreviated as "upper-limit limit switch") for detecting that the hook 6 has reached the upper limit.

It should be noted that, although we have explained an example in which the upper-limit limit switch 18 having contacts is used to detect reaching of the hook (load suspending jig) 6 to the upper limit, the upper limit reaching detection device for detecting reaching of the hook 6 to the upper limit is not limited thereto. It is also possible to use sensors of various types, e.g. a magnetic sensor, which detect reaching of the hook 6 to the upper limit in a non-contact manner.

Figure 2:
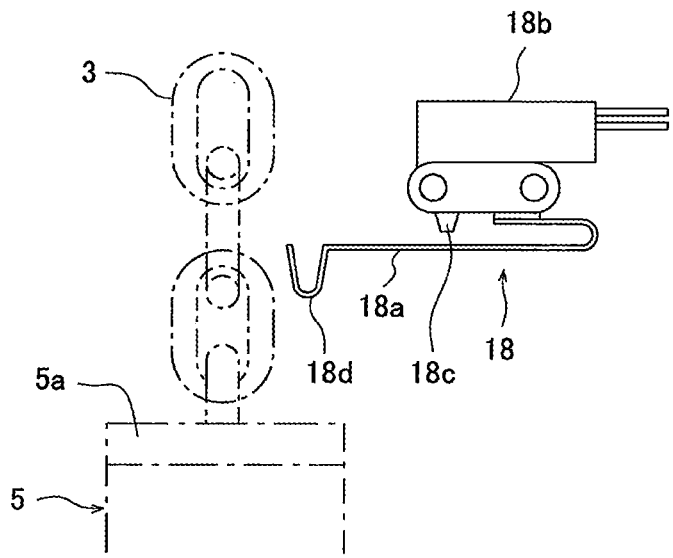
FIG. 2 is a diagram schematically showing the configuration of an upper limit reaching detection limit switch 18.

It should be noted that a cushion rubber 5a bonded to the upper surface of the coupling member 5 functions as a cushioning member that absorbs the impact of the collision of the hook 6 with the lower surface of the periphery of a chain guide hole 4a provided in the bottom of the machine casing 4 when the load chain 3 is over hoisted, and also has a function to push up a lower end 18d of a below-described lever portion 18a of the upper-limit limit switch 18. That is, as shown in FIG. 2, the upper-limit limit switch 18 has a lever portion 18a with a distal end bent in a U shape. When the lower end 18d of the bent portion of the lever portion 18a abuts on and is pushed up by the cushion rubber 5a of the coupling member 5, a driving projection 18c of a limit switch body 18b is pushed up, thus causing the limit switch body 18b to turn on. Further, the electric chain block 1 has a bucket 7 attached thereto underneath the machine casing 4 to accommodate the no-load side of the load chain 3 (i.e. a side of the load chain 3 opposite to the side to which the hook 6 is attached). That is, when the hook 6 lifts up, the load chain 3 is continuously accommodated into the bucket 7, and when the hook 6 lowers, the load chain 3 is continuously paid out from the bucket 7.

The electric chain block 1 has an operation unit 19 for controlling the operation of the machine. The operation unit 19 has a hoisting pushbutton switch 19a, a lowering pushbutton switch 19b, an emergency stop pushbutton switch 19c, etc. When the hoisting pushbutton switch 19a is pressed, a hoisting signal SU is sent to the control unit 25, and when the lowering pushbutton switch 19b is pressed, a lowering signal SD is sent to the control unit 25. When hoisting of a load (not shown) is to be performed with the above-described electric chain block 1, first, the load is attached to the hook 6 as a load suspending device, and thereafter, the hoisting pushbutton switch 19a of the operation unit 19 is pressed. Consequently, a hoisting signal SU is sent from the operation unit 19 to the control unit 25. Upon receiving the hoisting signal SU, the control unit 25 outputs a control signal S2 to the below-described SSR (solid-state relay) power circuit 121, thereby causing the SSR power circuit 121 to supply the stator coil of the alternating-current electric motor 10 with three-phase alternating-current electric power having a phase sequence for rotating the rotor in the forward direction. Consequently, the alternating-current electric motor 10 rotates in the forward direction, and the rotational force thereof is transmitted to the load sheave 2 via the friction clutch 11 and the speed reduction gear mechanism 13, causing the load sheave 2 to rotate in the direction for lifting up the hook 6.

When the hook 6 lifts up and reaches the upper limit, the cushion rubber 5a on the upper surface of the coupling member 5 abuts against and pushes the lower end 18d of the lever portion 18a, causing the driving projection 18c to be pressed upward. When the switch body portion 18b is thus activated (normally-closed contact opens), an upper limit reaching detection signal S1 is output to the control unit 25 to inform that the hook 6 has reached the upper limit. Upon receiving the upper limit reaching detection signal S1, the control unit 25 outputs a control signal S2 to the SSR power circuit 121 to cut off electric power supplied to the alternating-current electric motor 10. Thus, the alternating-current electric motor 10 stops. In addition, the electric current supplied to the electromagnetic brake 27 is cut off, so that the shaft of the rotor of the alternating-current electric motor 10 is mechanically restrained to stop the rotation.

As has been described above, a limit switch is used to detect reaching of the hook 6 of the electric chain block 1 to the upper limit, and it is conceivable to use a limit switch also to detect reaching of the hook 6 to the lower limit during the load lowering. However, the limit switch has a large number of components and requires complicated operations to install the components and adjust the operations thereof, as has been described above. Therefore, the limit switch is used only to detect reaching of the hook 6 to the upper limit, and reaching of the hook 6 to the lower limit is detected by using judgment based on the electric power type overload limiter.

Figure 3:
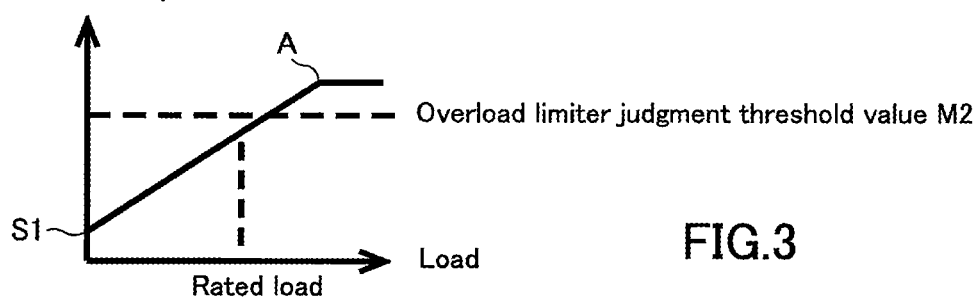
FIG. 3 is a diagram showing the change of power consumption of an electric motor with respect to the load in load hoisting of the electric chain block 1.
Figure 4:
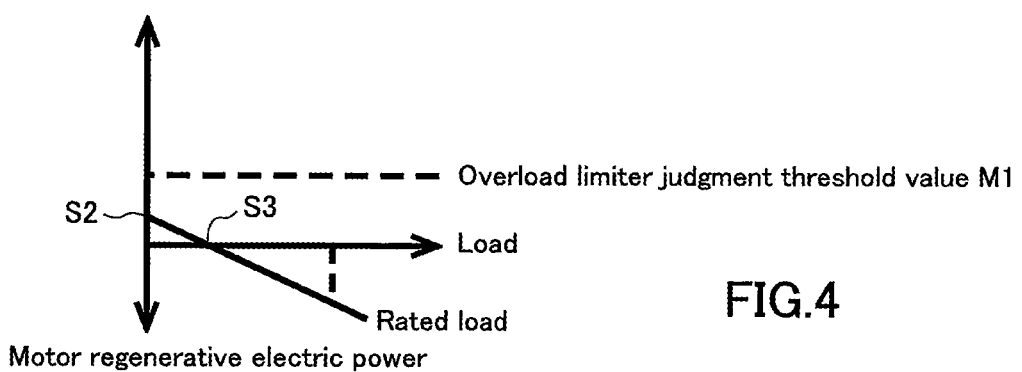
FIG. 4 is a diagram showing the change of power consumption of the electric motor with respect to the load in load lowering of the electric chain block 1.

FIGS. 3 and 4 are diagrams each showing the change of power consumption of the electric motor with respect to the load of the electric chain block 1. FIG. 3 shows the power consumption change in load hoisting, and FIG. 4 shows the same in load lowering. In load hoisting, as shown in FIG. 3, the power consumption of the alternating-current electric motor increases from a predetermined value (power consumption in no-load hoisting) S1 in proportion to the increase in load but reaches a maximum at point A at which the friction clutch 11 is activated. In contrast, in load lowering, as shown in FIG. 4, the power consumption of the alternating-current electric motor decreases from a predetermined value (power consumption in no-load lowering) S2 in inverse proportion to the increase in load and reaches zero at a predetermined load value S3. Thereafter, the alternating-current electric motor 10 functions as an electric power generator producing regenerative electric power.

As has been described above, when the electric chain block 1 operates to lower the load, as the weight of the load increases, the power consumption of the alternating-current electric motor 10 increases in the negative direction (i.e. the regenerative electric power increases). Therefore, there is no possibility of the electric power type overload limiter being activated depending on the magnitude of weight of the load. Accordingly, when the hook 6 reaches the lower limit, or when the load chain 3 becomes tangled in the chain bucket 7 and collides with the chain guide 4A or the like, the friction clutch 11 is activated, and the power consumption of the alternating-current electric motor 10 starts increasing in the positive direction. Therefore, this is detected with the electric power type overload limiter to detect that the hook 6 has reached the lower limit (i.e. the load cannot be lowered any more), and the alternating-current electric motor 10 is stopped. For the above-described judgment with the electric power type overload limiter in the lowering operation, a judgment time and a judgment threshold value are set which are different from those for the hoisting operation. That is, as will be described below, in FIG. 4, which shows the lowering operation, the level of the overload limiter judgment threshold value M1 is set lower than the level of the overload limiter judgment threshold value M2 in FIG. 3, which shows the hoisting operation, and higher than the level of the power consumption S2 in the no-load lowering operation. The reason why the value of the overload limiter judgment threshold value M1 is set as described above is as follows. The fact that the power consumption is higher than the power consumption S2 in the no-load lowering operation, during which the power consumption is the highest in the normal lowering operation, indicates that the hook 6 has reached the lower limit, or that the load chain 3 has become tangled in the chain bucket 7 and collided with the chain guide 4A or the like (i.e. the load cannot be lowered any more). Therefore, the alternating-current electric motor 10 is stopped a little earlier without waiting until the power consumption value reaches the level of the overload limiter judgment threshold value M2.

Figure 5:
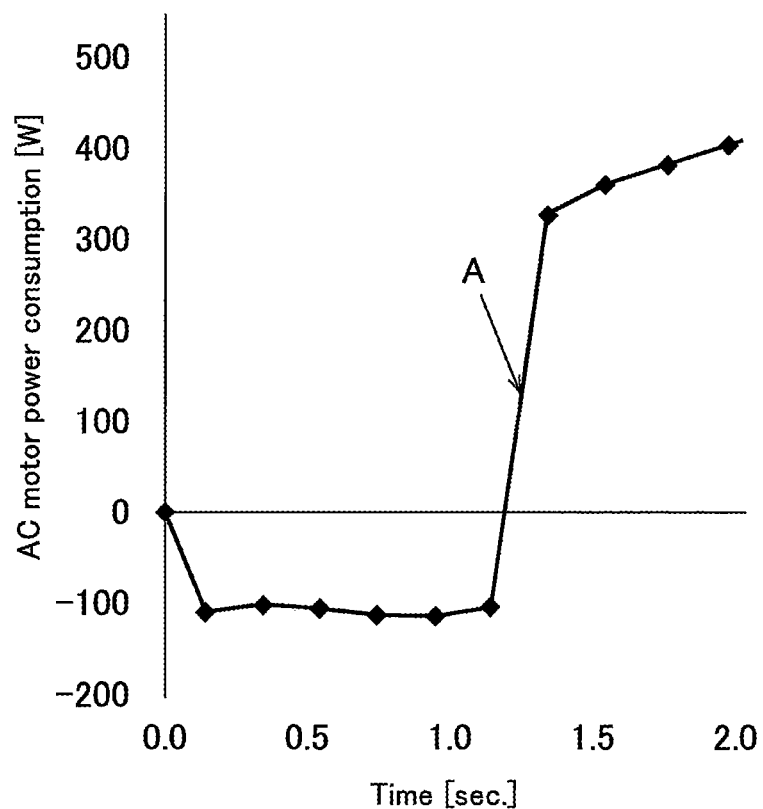
FIG. 5 is a diagram showing the way in which the power consumption changes from the starting of a three-phase alternating-current electric motor 10.
Figure 6:
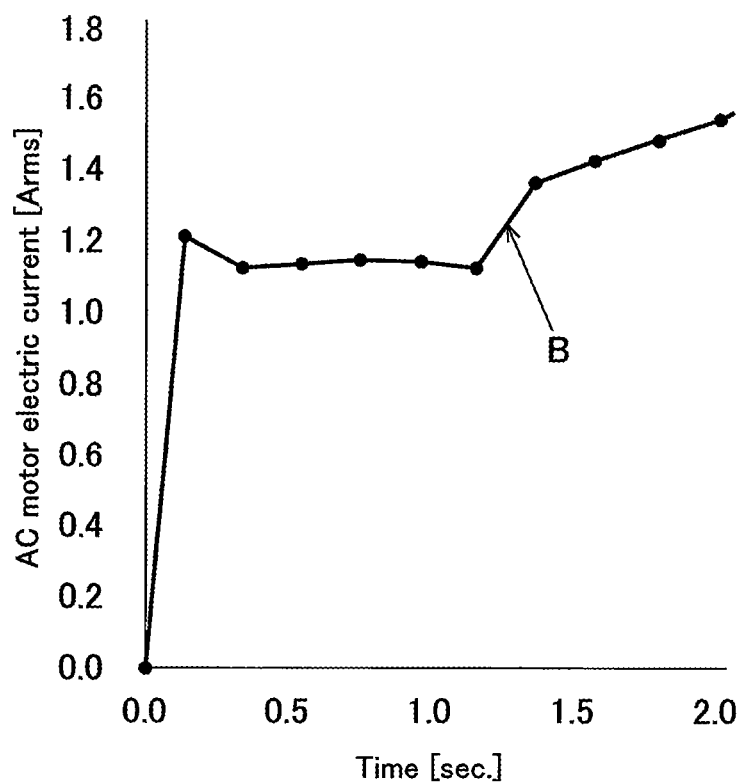
FIG. 6 is a diagram showing the way in which the current consumption changes from the starting of the three-phase alternating-current electric motor 10.

FIGS. 5 and 6 are diagrams showing the way in which the power consumption and the electric current change, respectively, from the starting of lowering operation of the alternating-current electric motor 10 of the electric chain block 1 shown in FIG. 1. Here, a three-phase electric motor of 200 V is used as the alternating-current electric motor 10. FIG. 5 shows measurements of the power consumption of the alternating-current electric motor 10 when operated to rotate in the load lowering direction. In FIG. 5, at point A, the lower limit is reached, and the friction clutch is activated. FIG. 6 shows measurements of the electric current (effective value) of the alternating-current electric motor 10 in the same load lowering operation as in FIG. 5. The following will be appreciated. In FIG. 5, at point A (at which the hook 6 reaches the lower limit), the friction clutch 11 is activated, and the alternating-current electric motor 10 shifts from regenerative operation to power running (electric power consuming) operation. In FIG. 6, at point B (the hook 6 reaches the lower limit at the same point of time as point A in FIG. 5), the friction clutch 11 is activated; however, there is no such large change in electric current as the change in electric power in FIG. 5.

Figure 7:
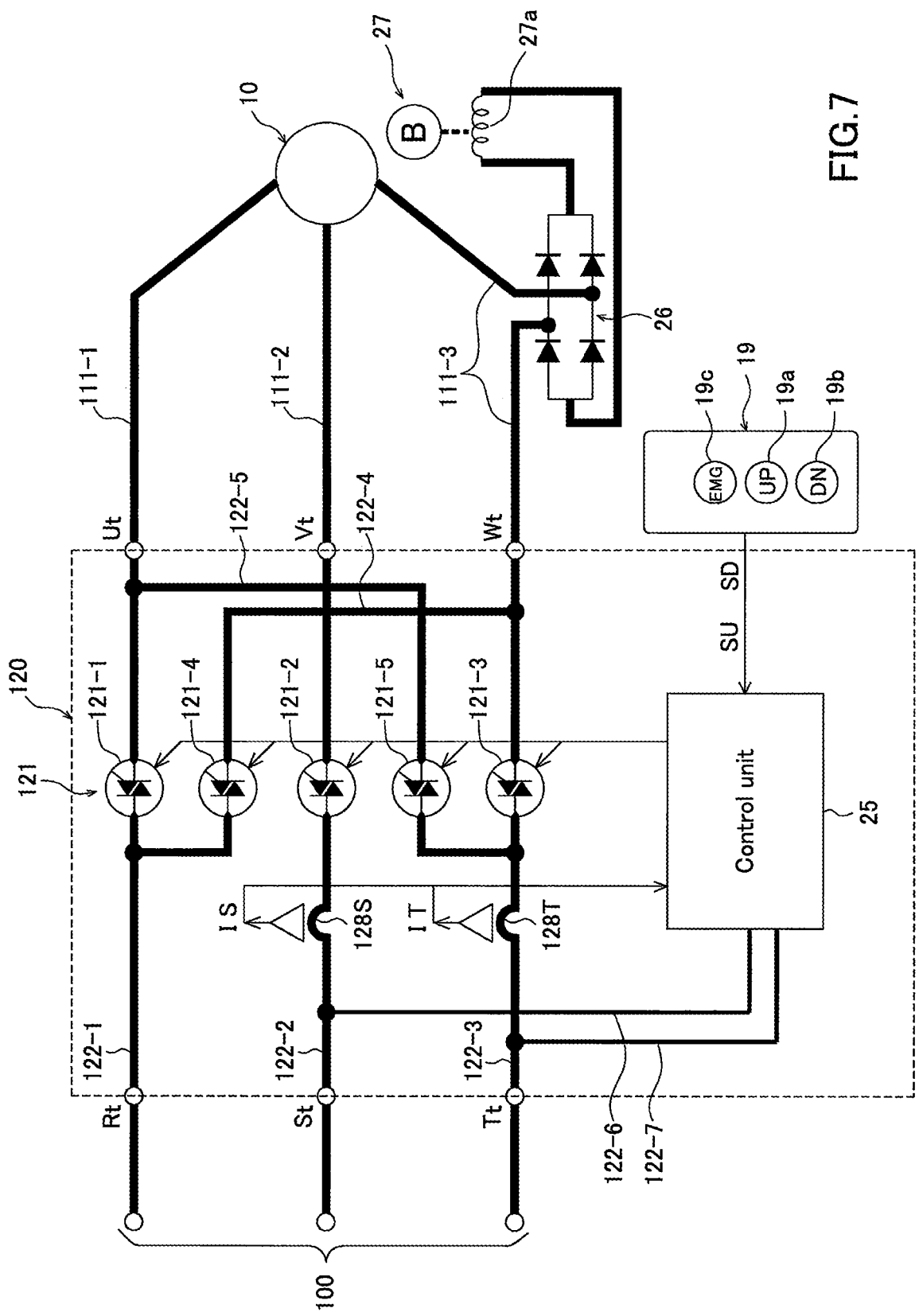
FIG. 7 is a diagram showing a configuration example of a control device for an electric chain block with a three-phase alternating-current electric motor 10.

FIG. 7 is a diagram showing a configuration example of a control device for an electric chain block with a three-phase alternating-current electric motor. Let us here explain an example in which a three-phase alternating-current electric motor (in this example, three-phase induction electric motor) 10 is used as an electric motor for hoisting and lowering a load. The electric chain block control device includes a control board 120. The control board 120 has five non-contact switching devices 121-1 to 121-5 mounted thereon to constitute an SSR (solid-state relay) power circuit (three-phase non-contact device) 121. Here, the non-contact switching devices 121-1 to 121-3 are devices for rotating the three-phase alternating-current electric motor 10 in forward direction, i.e. in a direction for hoisting (lifting up) the load, and the non-contact switching devices 121-4, 121-2 and 121-5 are devices for rotating the three-phase alternating-current electric motor 10 in reverse direction, i.e. in a direction for lowering (lowering down) the load.

Further, the control board 120 is provided on an input side thereof with three supply terminals Rt, St and Tt for supplying a three-phase alternating current from a three-phase alternating-current power supply 100 and further provided with three output terminals Ut, Vt and Wt for outputting to the three-phase alternating-current electric motor 10 a three-phase alternating current controlled by the control board 120. The non-contact switching device 121-1 is disposed between the supply terminal Rt and the output terminal Ut through a pattern wiring 122-1. The non-contact switching device 121-2 is disposed between the supply terminal St and the output terminal Vt through a pattern wiring 122-2. The non-contact switching device 121-3 is disposed between the supply terminal Tt and the output terminal Wt through a pattern wiring 122-3. The non-contact switching devices 121-1, 121-2 and 121-3 form three current paths, respectively, for supplying the three-phase alternating-current electric motor 110 with a three-phase alternating current generating a rotating magnetic field for rotating a rotor (not shown) of the three-phase alternating-current electric motor 110 in forward direction.

Further, the non-contact switching device 121-4 is disposed between the supply terminal Rt and the output terminal Wt through a pattern wiring 122-4, and the non-contact switching device 121-5 is disposed between the supply terminal Tt and the output terminal Ut through a pattern wiring 122-5. The combination of the non-contact switching device 121-4 and the pattern wiring 122-4, the combination of the non-contact switching device 121-5 and the pattern wiring 122-5, and the combination of the non-contact switching device 121-2 and the pattern wiring 122-2 form three current paths, respectively, for supplying the three-phase alternating-current electric motor 10 with a three-phase alternating current generating a rotating magnetic field for rotating the rotor of the three-phase alternating-current electric motor 10 in reverse direction.

Further, a current sensor 128S is disposed between the supply terminal St and the non-contact switching device 121-2 through the pattern wiring 122-2 to detect an S-phase current supplied to a V-phase winding of the three-phase alternating-current electric motor 10. Further, a current sensor 128T is disposed between the supply terminal Tt and the non-contact switching device 121-3 through the pattern wiring 122-3 to detect a T-phase current supplied to a W-phase winding or U-phase winding of the three-phase alternating-current electric motor 10.

Further, the control board 120 has mounted thereon a control unit 25 comprising a microcomputer and various circuits. The control unit 25 is supplied as an input with an alternating-current voltage (interphase voltage) input between the phases of the supply terminal St and the supply terminal Tt through pattern wirings 122-6 and 122-7. Further, detection current values IS and IT detected by the current sensors 128S and 128T are input to the control unit 25. The control unit 25 determines power consumption, smoothed electric power value, etc. from the voltage and electric current values input thereto and further performs electric power type overload limiter judgment. Further, lead wires 111-1 and 111-2 connected to the windings of U and V phases of the stator of the three-phase alternating-current electric motor 10 are connected to the output terminals Ut and Vt, respectively, of the control board 120, and a lead wire 111-3 connected to the winding of W phase of the stator of the three-phase alternating-current electric motor 10 is connected to the output terminal Wt of the control board 120 via a full-wave rectification circuit 26.

Reference numeral 27 denotes an electromagnetic brake. The electromagnetic brake 27 has an exciting coil 27a connected to the output end of the full-wave rectification circuit 26. An alternating current from the output terminal Wt of the control board 120 is converted into a direct current through the full-wave rectification circuit 26 and supplied to the exciting coil 27a as a brake current. Consequently, the electromagnetic brake 27 is released, and the rotor of the three-phase alternating-current electric motor 10 becomes unrestrained.

Reference numeral 19 denotes an operation unit of the electric chain block control device. The operation unit 19 has an emergency stop pushbutton switch 19c, a hoisting pushbutton switch 19a, a lowering pushbutton switch 19b, etc. When the hoisting pushbutton switch 19a, for example, of the operation unit 19 is pressed in a state where the three-phase alternating-current power supply (commercial three-phase power supply) 100 has been turned on through the supply terminals Rt, St and Tt of the control board 120, a hoisting signal SU is output to the control unit 25, and the non-contact switching devices 121-1, 121-2 and 121-3 of the SSR power circuit 121 are controlled to turn on by processing with the control unit 25, so that the stator windings of the three-phase alternating-current electric motor 10 are supplied with a three-phase electric current generating a rotating magnetic field for rotating the rotor of the three-phase alternating-current electric motor 10 in the load hoisting direction. At the same time, the exciting coil 27a of the electromagnetic brake 27 is supplied with a brake current through the full-wave rectification circuit 26 to release the electromagnetic brake 27. Consequently, the rotor of the three-phase alternating-current electric motor 10 rotates in the load hoisting direction to hoist (lift up) the load.

When the load reaches a predetermined position, the pressing of the hoisting pushbutton switch 19a is stopped. Consequently, the hoisting signal SU to the control unit 25 is stopped, and the non-contact switching devices 121-1, 121-2 and 121-3 are opened (off) by processing with the control unit 25. Thus, the electric current to the three-phase alternating-current electric motor 10 is stopped. At the same time, the brake current to the exciting coil 27a of the electromagnetic brake 27 is stopped, and the electromagnetic brake 27 is mechanically operated to stop (restrain) the rotor of the three-phase alternating-current electric motor 10.

When the lowering pushbutton switch 19b of the operation unit 19 is pressed, a lowering signal SD is output to the control unit 25, and the non-contact switching devices 121-4, 121-2 and 121-5 of the three-phase non-contact device 121 are controlled to turn on by processing with the control unit 25, so that the three-phase alternating-current electric motor 10 is supplied with a three-phase electric current generating a rotating magnetic field for rotating the rotor of the three-phase alternating-current electric motor 10 in the load lowering direction. At the same time, the exciting coil 27*a* of the electromagnetic brake 27 is supplied with a brake current through the full-wave rectification circuit 26 to release the electromagnetic brake 27. Thus, the rotor of the three-phase alternating-current electric motor 10 rotates to lower (lower down) the load.

When the load reaches a predetermined position, the pressing of the lowering pushbutton switch 19*b* is stopped. Consequently, the lowering signal SD to the control unit 25 is stopped, and the non-contact switching devices 121-4, 121-2 and 121-5 are opened by processing with the control unit 25. Thus, the electric current to the three-phase alternating-current electric motor 10 is stopped. At the same time, the brake current to the exciting coil 27*a* of the electromagnetic brake 27 is stopped, and the electromagnetic brake 27 is mechanically operated to stop (restrain) the rotor of the three-phase alternating-current electric motor 10.

Figure 8:
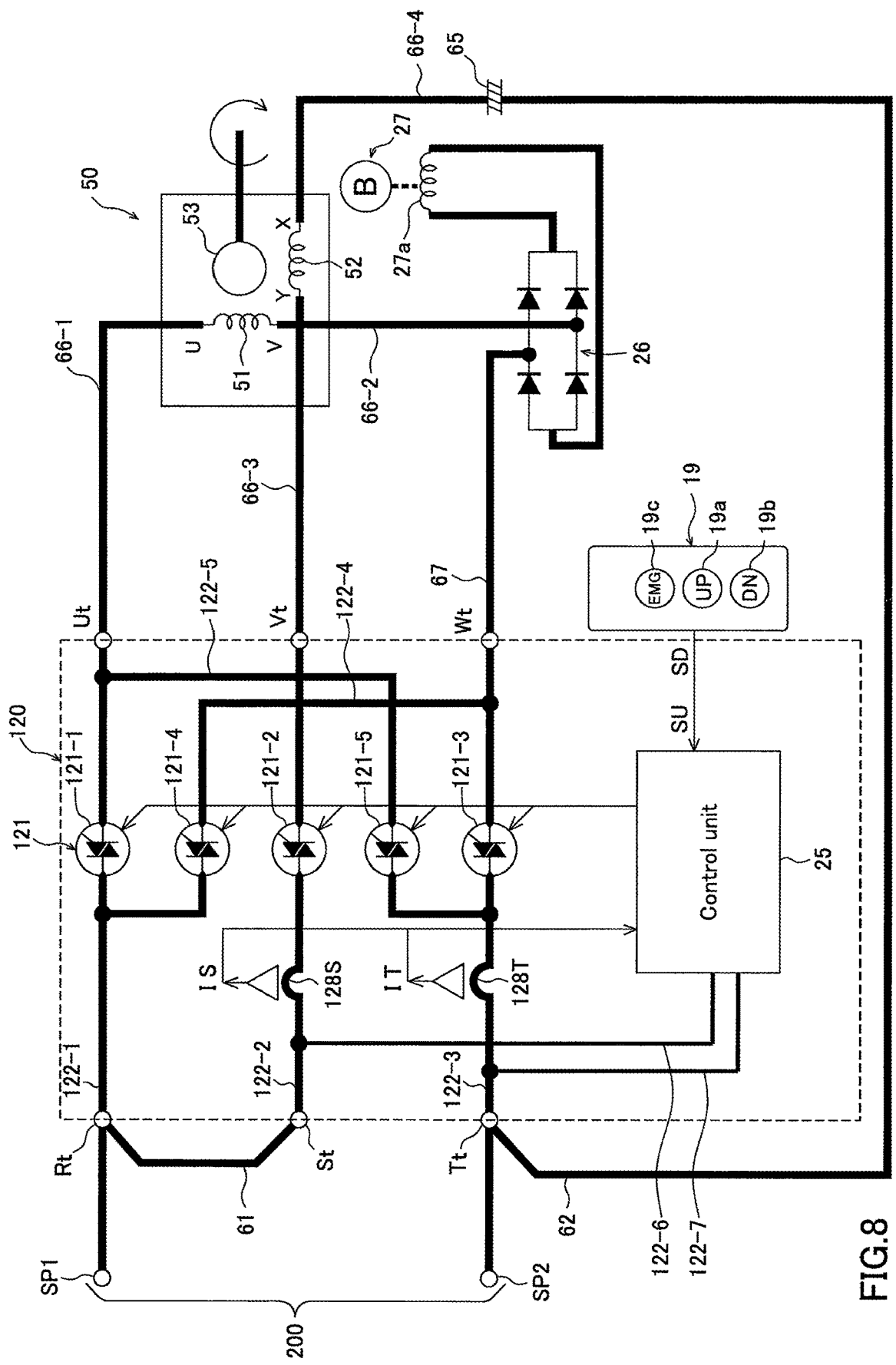
FIG. 8 is a diagram showing a configuration example of a control device for an electric chain block with a single-phase alternating-current electric motor 50.

FIG. 8 is a diagram showing a configuration example of a control device for an electric chain block with a single-phase alternating-current electric motor (in this example, single-phase induction electric motor) 50 as a load hoisting-lowering electric motor. In FIG. 8, the control board 120 itself has the same configuration as that of the control board 120 of the electric chain block control device shown in FIG. 7. That is, a non-contact switching device 121-1 is disposed between the supply terminal Rt and the output terminal Ut through a pattern wiring 122-1. A non-contact switching device 121-2 is disposed between the supply terminal St and the output terminal Vt through a pattern wiring 122-2. A non-contact switching device 121-3 is disposed between the supply terminal Tt and the output terminal Wt through a pattern wiring 122-3. Further, a non-contact switching device 121-4 is disposed between the supply terminal Rt and the output terminal Wt through a pattern wiring 122-4, and a non-contact switching device 121-5 is disposed between the supply terminal Tt and the output terminal Ut through a pattern wiring 122-5.

In FIG. 8, two crossover wires (external wiring) 61 and 62 are added to the input side of the control board 120 where the supply terminals Rt, St and Tt are disposed. The first crossover wire 61 is connected to the supply terminal Rt and the supply terminal St to electrically unite (short-circuit) the two terminals, and one end of the crossover wire 61 is defined as a single-phase alternating-current power supply terminal SP1 to which is connected one terminal of a single-phase alternating-current power supply (commercial single-phase power supply) 200. The second crossover wire 62 is electrically connected at a midpoint thereof to the supply terminal Tt, and one end of the crossover wire 62 is defined as a single-phase supply terminal SP2 to which is connected the other terminal of the single-phase alternating-current power supply (commercial single-phase power supply) 200. The other end of the crossover wire 62 is connected to a phase-advancing capacitor 65.

A single-phase alternating-current electric motor 50 is disposed on the output side of the control board 120 where the output terminals Ut, Vt and Wt are disposed. The single-phase alternating-current electric motor 50 is configured to include a main winding 51 and an auxiliary winding 52. One end U of the main winding 51 is connected to the output terminal Ut of the control board 120 through a lead wire 66-1, and the other end V of the main winding 51 is connected to a midpoint of a full-wave rectification circuit 26 through a lead wire 66-2. The output end of the full-wave rectification circuit 26 is connected to one end of the exciting coil 27*a* of the electromagnetic brake 27. The other end of the exciting coil 27*a* is connected to the output terminal Wt of the control board 120 via the full-wave rectification circuit 26. One end Y of the auxiliary winding 52 is connected to the output terminal Vt of the control board 120 through a lead wire 66-3, and the other end X of the auxiliary winding 52 is connected to one end of the phase-advancing capacitor 65 through a lead wire 66-4.

The electric chain block control device shown in FIG. 8 also has an operation unit 19 including an emergency stop pushbutton switch 19*c*, a hoisting pushbutton switch 19*a*, a lowering pushbutton switch 19*b*, etc. and further has a control unit 25, in the same way as in FIG. 7. The electric chain block control device shown in FIG. 8 is the same as the electric chain block control device shown in FIG. 7 in the following points. Namely, when the hoisting pushbutton switch 19*a*, for example, of the operation unit 19 is pressed in a state where the single-phase alternating-current power supply 200 has been connected between the single-phase alternating-current power supply terminals SP1 and SP2 and turned on, a hoisting signal SU is output to the control unit 25, and when the lowering pushbutton switch 19*b* is pressed in the above-described state, a lowering signal SD is output to the control unit 25. Further, the non-contact switching devices 121-1, 121-2, 121-3, 121-4 and 121-5 are on-off controlled by control signals from the control unit 25, so that the rotor of the single-phase alternating-current electric motor rotates in the load hoisting direction or in the load lowering direction according to the control signals.

Figure 9:
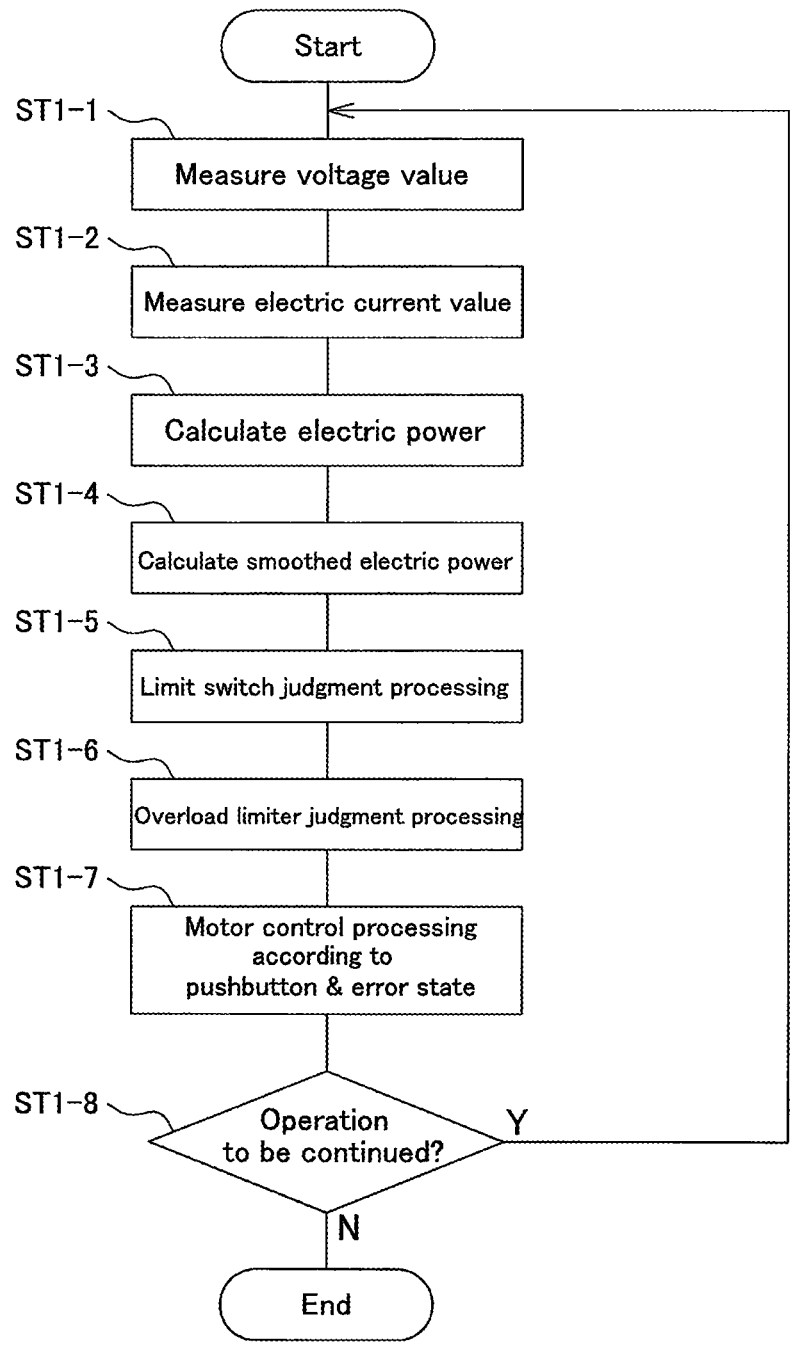
FIG. 9 is a flow chart for controlling the operation of the electric chain block 1.

Next, one example of control performed by the control unit 25 of the electric chain block 1 will be explained by using FIGS. 9 to 11. FIG. 9 is a flow chart for controlling the operation of the electric chain block 1 by the control unit 25.

As shown in the figure, the control unit 25 first measures a voltage value and an electric current value (step 1-1, step 1-2). Next, the control unit 25 calculates an electric power value from the measured voltage and electric current values (step 1-3).

Next, the control unit 25 calculates two different smoothed electric power values from the electric power value (step 1-4). Here, the smoothed electric power value is an electric power value obtained by smoothing the electric power value varying up and down in a predetermined cycle when the load chain 3 is hoisted or lowered. One of the two different smoothed electric power values is a smoothed electric power value X1 obtained by smoothing the alternating-current electric power of the three-phase alternating-current power supply 100. The other smoothed electric power value is a smoothed electric power value X2 obtained by smoothing the up-and-down variation of the electric power value resulting from variation in load due to the polygonal configuration of the load sheave 2 during hoisting. The smoothed electric power value X1 is used in lowering, during which no load is applied from the load chain 3. The smoothed electric power value X2 is used in hoisting, during which a load is applied from the load chain 3. In other words, the smoothed electric power value X1 is an electric power value smoothed by a half-cycle ($\frac{1}{120}$ sec. at 60 Hz) of the alternating-current cycle of the three-phase alternating-current power supply 100. The smoothed electric power value X2 is an electric power smoothed by the variation cycle of the load sheave 2.

Next, the process proceeds to step 1-5, at which limit switch judgment processing is performed. The limit switch judgment processing judges whether or not the cushion rubber 5*a* of the coupling member 5 has abutted against the upper-limit limit switch 18 as a result of the load chain 3 being hoisted, and performs the processing.

Figure 10:
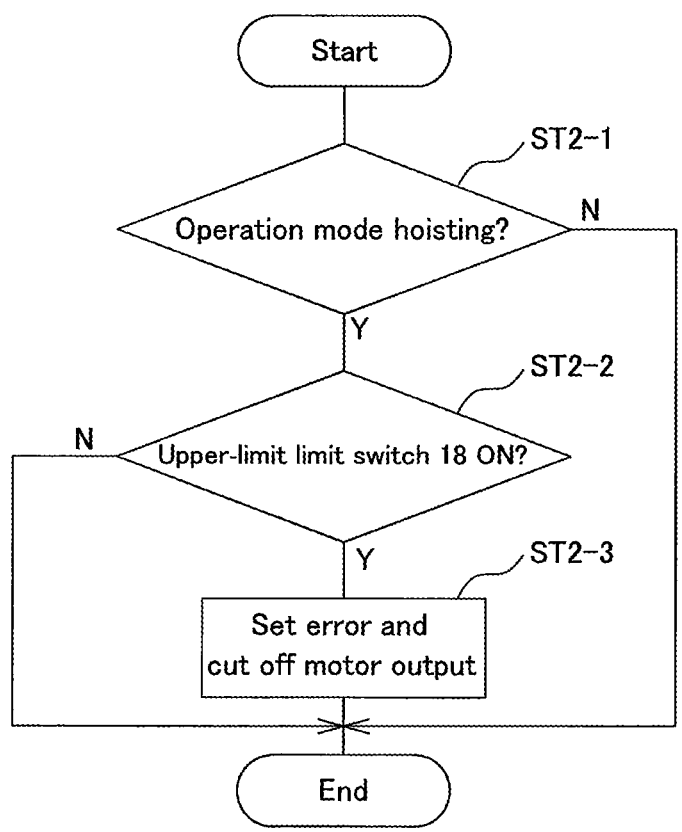
FIG. 10 is a flow chart of limit switch judgment processing.

FIG. 10 is a flow chart of the above-described limit switch judgment processing. As shown in the figure, the control unit 25 first judges whether the current operation mode is hoisting or lowering. If the operation mode is lowering, there is no possibility of the coupling member 5 abutting against the upper-limit limit switch 18; therefore, the limit switch judgment processing is skipped ("No" at step 2-1).

On the other hand, if the operation mode is hoisting, "Yes" is the result at step 2-1; therefore, the process proceeds to step 2-2, at which it is judged whether or not the upper-limit limit switch 18 has been turned on. If it is judged that the upper-limit limit switch 18 has been turned on, the process proceeds to step 2-3, at which an error "Upper Limit" is stored (set) in the control unit 25. At the same time, the control unit 25 cuts off the supply of electric power to the alternating-current electric motor 10. The cut-off of the electric power can be reset, for example, by depressing the lowering pushbutton switch 19b or emergency stop pushbutton switch 19c of the operation unit 19. If it is judged at step 2-2 that the upper-limit limit switch 18 has not been turned on ("No" at step 2-2), the step 2-3 is skipped, and the process is ended.

Next, returning to FIG. 9, the control unit 25 performs overload limiter judgment processing (step 1-6). The overload limiter judgment processing is as follows. When a load greater than a predetermined value is applied to the alternating-current electric motor 10 during hoisting or lowering of the load chain 3, the overload limiter judgment processing detects this fact, and stops the alternating-current electric motor 10, and so forth.

Figure 11:
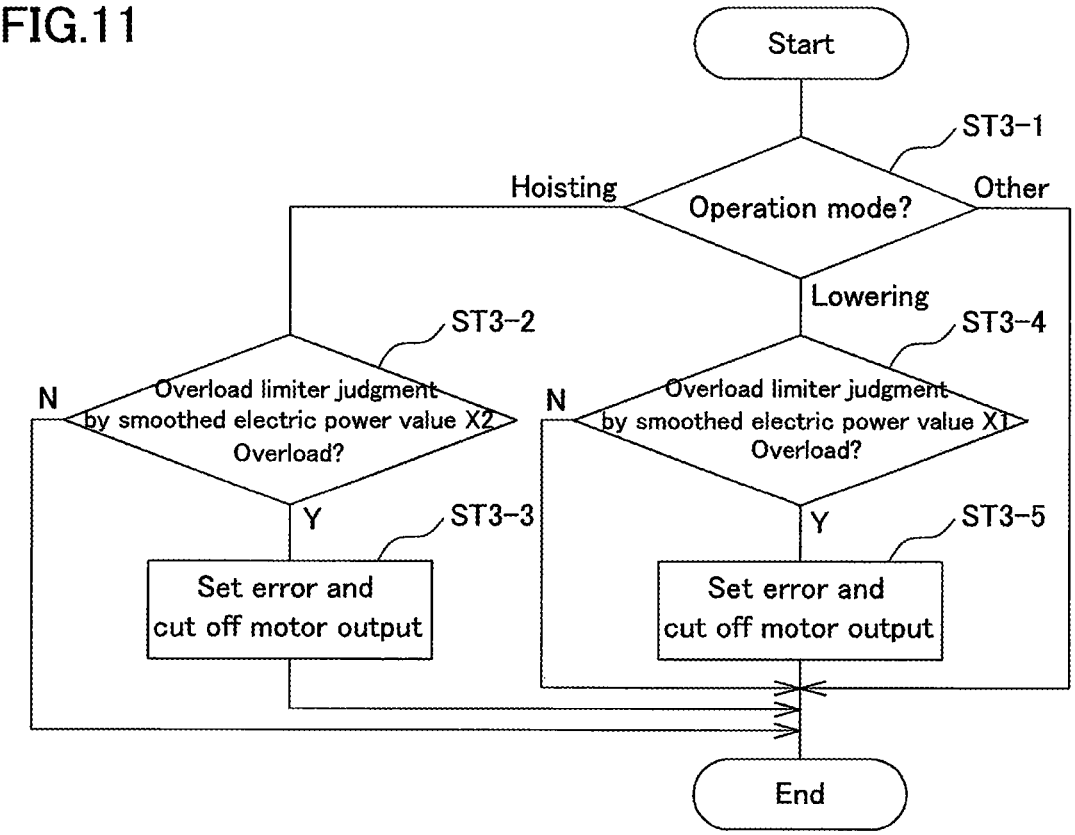
FIG. 11 is a flow chart of overload limiter judgment processing.

FIG. 11 is a flow chart of the above-described overload limiter judgment processing. As shown in the figure, the control unit 25 first judges at step 3-1 whether the current operation mode is "Hoisting" or "Lowering" or "Other (not working)". If the result at the step 3-1 is "Other", it means that neither hoisting nor lowering is being carried out, and overload limiter judgment processing need not be performed. Accordingly, the overload limiter judgment processing is skipped.

Next, if it is judged at step 3-1 that the current operation mode is "Hoisting", the process proceeds to step 3-2, at which it is judged whether or not the smoothed electric power value X2 calculated at step 1-4, which is shown in FIG. 9, is in excess of a predetermined judgment threshold value M2. If it is judged that the smoothed electric power value X2 is in excess of the predetermined judgment threshold value M2, it is judged to be overloaded ("Yes" is the result at step 3-2), and an error "Overload" is stored (error flag is set) in the control unit 25. At the same time, the control unit 25 cuts off the supply of electric power to the alternating-current electric motor 10 (step 3-3). Overload occurs, for example, when a load not less than the rated load is suspended from the hook 6 (see FIG. 3). On the other hand, if the smoothed electric power value X2 is not in excess of the predetermined judgment threshold value M2, it is judged to be not overloaded ("No" is the result at step 3-2), and step 3-3 is skipped to end the process.

Next, at step 3-1, if the current operation mode is "Lowering", the process proceeds to step 3-4, at which it is judged whether or not the smoothed electric power value X1 calculated at step 1-4, which is shown in FIG. 9, has exceeded a predetermined overload limiter judgment threshold value M1. If the smoothed electric power value X1 is in excess of the overload limiter judgment threshold value M1, it is judged that the lower limit has been reached (lowering cannot be performed any more) ("Yes" is the result at step 3-4), and an error "Lower Limit" is stored (error flag is set) in the control unit 25. At the same time, the control unit 25 cuts off the supply of electric power to the alternating-current electric motor 10 (step 3-5). As has been described above, overload occurs, for example, when the stopper 8 engages the lower surface of the periphery of the chain guide hole 4b in the chain guide 4A, which is provided in the bottom of the machine casing 4, due to over lowering of the chain, or when the load chain 3 becomes tangled in the chain bucket 7 and collides with the chain guide 4A or the like, thus causing the friction clutch 11 to be activated (see FIG. 5). It should be noted that the level of the overload limiter judgment threshold value M1 for lowering is set lower than the level of the overload limiter judgment threshold value M2 for hoisting and higher than the power consumption S2 in the no-load lowering operation, as has been described above. On the other hand, if the smoothed electric power value X1 is judged at step 3-4 to be not in excess of the predetermined overload limiter judgment threshold value M1, it is judged to be not overloaded ("No" is the result at step 3-4), and step 3-5 is skipped to end the process.

Next, the process proceeds to step 1-7 shown in FIG. 9, at which the control unit 25 performs motor control processing according to the pushbutton switch pressing state and error state. In other words, the control unit 25 executes hoisting or lowering control according to the state of error flag and signals from various pushbutton switches 19a to 19c of the operation unit 19. If no error flag has been set, the normal operation is allowed to be continued as it is. If an error flag has been set, the operation is controlled according to the kind of error flag. Error flags may be roughly classified, according to their kind, into those indicating resettable operations and those indicating non-resettable operations. For example, if the error "Overload" has been set, the operation of the hoisting pushbutton switch 19a is unacceptable (non-resettable), and the error can be canceled (reset) by depressing the emergency stop pushbutton switch 19c or the lowering pushbutton switch 19b. If the error "Lower Limit" has been set, the operation of the lowering pushbutton switch 19b is unacceptable (non-resettable), and the error can be canceled (reset) by depressing the emergency stop pushbutton switch 19c or the hoisting pushbutton switch 19a.

After the above-described motor control processing, if the operation is to be continued, the process proceeds to step 1-1 to continue the operation; if the operation is not to be continued, the operation is stopped (step 1-8).

As has been described above, the upper and lower limit detecting apparatus or method for the hook (load suspending device) 6 of the electric chain block 1 according to this embodiment detects reaching of the hook 6 to the upper limit during hoisting by the upper limit reaching detection limit switch (upper limit reaching detection device) 18 and, on the other hand, detects reaching of the hook 6 to the lower limit during lowering by judging, with an electric power type overload limiter, that the power consumption of the alternating-current electric motor 10 has exceeded a predetermined value as a result of activation of the friction clutch 11. Accordingly, it becomes unnecessary to use a lower limit reaching detection device such as a limit switch, which requires a large number of components, to detect reaching of the hook 6 to the lower limit, and it is possible to detect reaching of the hook 6 to the lower limit by simply changing the software of a microcomputer provided in the electric chain block 1.

Although one embodiment of the present invention has been explained above, the present invention is not limited to the above-described embodiment but can be modified in a variety of ways without departing from the scope of the claims and the technical idea indicated in the specification and the drawings.

LIST OF REFERENCE SIGNS

1: electric chain block
2: load sheave (rotating device)
3: load chain (pulling device)
4: machine casing
4A: chain guide
5: coupling member
6: hook (load suspending device)
7: chain bucket
8: stopper
10: three-phase alternating-current electric motor (electric motor, alternating-current electric motor, three-phase induction electric motor)
11: friction clutch (clutch with overload preventing device)
13: speed reduction gear mechanism
18: upper limit reaching detection limit switch (upper limit reaching detection device, upper-limit limit switch)
19: operation unit
25: control unit
26: full-wave rectification circuit
27: electromagnetic brake
27a: exciting coil
50: single-phase alternating-current electric motor (electric motor, single-phase induction electric motor)
100: three-phase alternating-current power supply (commercial three-phase power supply)
120: control board
121: SSR (solid-state relay) power circuit (three-phase non-contact device)
121-1 to 121-5: non-contact switching devices
200: single-phase alternating current power supply (commercial single-phase power supply)
M2: overload limiter judgment threshold value (for lowering)
M2: overload limiter judgment threshold value (for hoisting)

The invention claimed is:

1. An upper and lower limit detecting apparatus for a load suspending device of an electric chain block including an electric motor, a rotational force transmission mechanism rotated by the electric motor, a rotating device rotated by the rotational force transmission mechanism, and a load chain wound on the rotating device to perform hoisting and lowering, wherein a load engaged with the load suspending device attached to a load-side end of the load chain is hoisted (lifted up) or lowered (lowered down);
the upper and lower limit detecting apparatus comprising an upper limit reaching detection device detecting reaching of the load suspending device to an upper limit, and a friction clutch (overload preventing coupling) provided in the rotational force transmission mechanism;
wherein reaching of the load suspending device to the upper limit during the hoisting is detected by the upper limit reaching detection device, and reaching of the load suspending device to a lower limit during the lowering is detected by judging, with an electric power type overload limiter, that power consumption of the electric motor has exceeded a predetermined value as a result of activation of the friction clutch,
wherein a judgment threshold value of the electric power type overload limiter for the lowering of the load suspending device is set to a value less than a judgment threshold value of the electric power type overload limiter for the hoisting of the load suspending device and greater than power consumption in no-load lowering of the load suspending device.

2. The upper and lower limit detecting apparatus of claim 1, wherein the upper limit reaching detection device is a limit switch.

3. An upper and lower limit detecting method for a load suspending device of an electric chain block, comprising the steps of:
preparing the electric chain block including an electric motor, a rotational force transmission mechanism rotated by the electric motor, a rotating device rotated by the rotational force transmission mechanism, and a load chain wound on the rotating device to perform hoisting and lowering, wherein a load engaged with the load suspending device attached to a load-side end of the load chain is hoisted (lifted up) or lowered (lowered down);
detecting reaching of the load suspending device to an upper limit by an upper limit reaching detection device provided in the electric chain block; and
detecting reaching of the load suspending device to a lower limit by judging, with an electric power type overload limiter, that power consumption of the electric motor has exceeded a predetermined value as a result of activation of a friction clutch (overload preventing coupling) provided in the rotational force transmission mechanism,
wherein a judgment threshold value of the electric power type overload limiter for the lowering of the load suspending device is set to a value less than a judgment threshold value of the electric power type overload limiter for the hoisting of the load suspending device and greater than power consumption in no-load lowering of the load suspending device.

4. An upper and lower limit detecting apparatus for a load suspending device of an electric chain block including an electric motor, a rotational force transmission mechanism rotated by the electric motor, a rotating device rotated by the rotational force transmission mechanism, and a load chain wound on the rotating device to perform hoisting and lowering, wherein a load engaged with the load suspending device attached to a load-side end of the load chain is hoisted (lifted up) or lowered (lowered down);
the upper and lower limit detecting apparatus comprising an upper limit reaching detection device detecting reaching of the load suspending device to an upper limit, and a friction clutch (overload preventing coupling) provided in the rotational force transmission mechanism;
wherein reaching of the load suspending device to the upper limit during the hoisting is detected by the upper limit reaching detection device, and reaching of the load suspending device to a lower limit during the lowering is detected by judging, with an electric power type overload limiter, that power consumption of the electric motor has exceeded a predetermined value as a result of activation of the friction clutch,
wherein the upper limit reaching detection device is a limit switch, and wherein the upper and lower limit detecting apparatus does not include a limit switch to detect reaching of the load suspending device to the lower limit during the lowering.

* * * * *